US012639033B2

(12) United States Patent
Lee et al.

(10) Patent No.: US 12,639,033 B2
(45) Date of Patent: May 26, 2026

(54) IMAGE DISPLAY APPARATUS

(71) Applicant: LG ELECTRONICS INC., Seoul (KR)

(72) Inventors: Hansu Lee, Seoul (KR); Dongjin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/788,775

(22) Filed: Jul. 30, 2024

(65) Prior Publication Data

US 2025/0130760 A1 Apr. 24, 2025

(30) Foreign Application Priority Data

Oct. 19, 2023 (KR) ........................ 10-2023-0140067

(51) Int. Cl.
*G06F 3/14* (2006.01)
*G06F 3/16* (2006.01)
(52) U.S. Cl.
CPC ............ *G06F 3/165* (2013.01); *G06F 3/1454* (2013.01); *G06F 3/162* (2013.01)
(58) Field of Classification Search
CPC ......... G06F 3/165; G06F 3/1454; G06F 3/162
See application file for complete search history.

(56) References Cited

U.S. PATENT DOCUMENTS

| | | | |
|---|---|---|---|
| 2007/0198862 A1* | 8/2007 | Sato | G06F 1/1632 |
| | | | 713/300 |
| 2013/0234913 A1* | 9/2013 | Thangadorai | G06F 3/1423 |
| | | | 345/2.1 |
| 2014/0347433 A1 | 11/2014 | Kafle et al. | |
| 2020/0380901 A1* | 12/2020 | Ryu | G06F 3/1423 |
| 2021/0168430 A1* | 6/2021 | Kim | H04S 1/007 |
| 2021/0303253 A1* | 9/2021 | Hwang | G06Q 20/02 |
| 2022/0232307 A1* | 7/2022 | Ju | G06F 3/14 |

OTHER PUBLICATIONS

Wi-Fi Alliance: "Wi-Fi Display Technical Specification, Version 2.1," Jul. 31, 2017, XP055767970, pp. 1-196.

* cited by examiner

*Primary Examiner* — Towfiq Elahi
(74) *Attorney, Agent, or Firm* — Birch, Stewart, Kolasch & Birch, LLP

(57) ABSTRACT

An image display apparatus according to an embodiment of the present disclosure includes: a display; a network interface configured to communicate with an external device; and a controller, the controller being configured to: obtain device information from the external device; based on the obtained device information, determine whether a specification of the external device in association with audio signal processing satisfies a predetermined criterion; based on a determination that the specification of the external device does not satisfy the predetermined criterion, transmit first audio data for predetermined content being displayed through the display; based on a determination that the specification of the external device does not satisfy the predetermined criterion, process an audio signal corresponding to the first audio data according to the specification of the external device; and generate second audio data corresponding to the processed audio signal to transmit the second audio data to the external device.

9 Claims, 11 Drawing Sheets

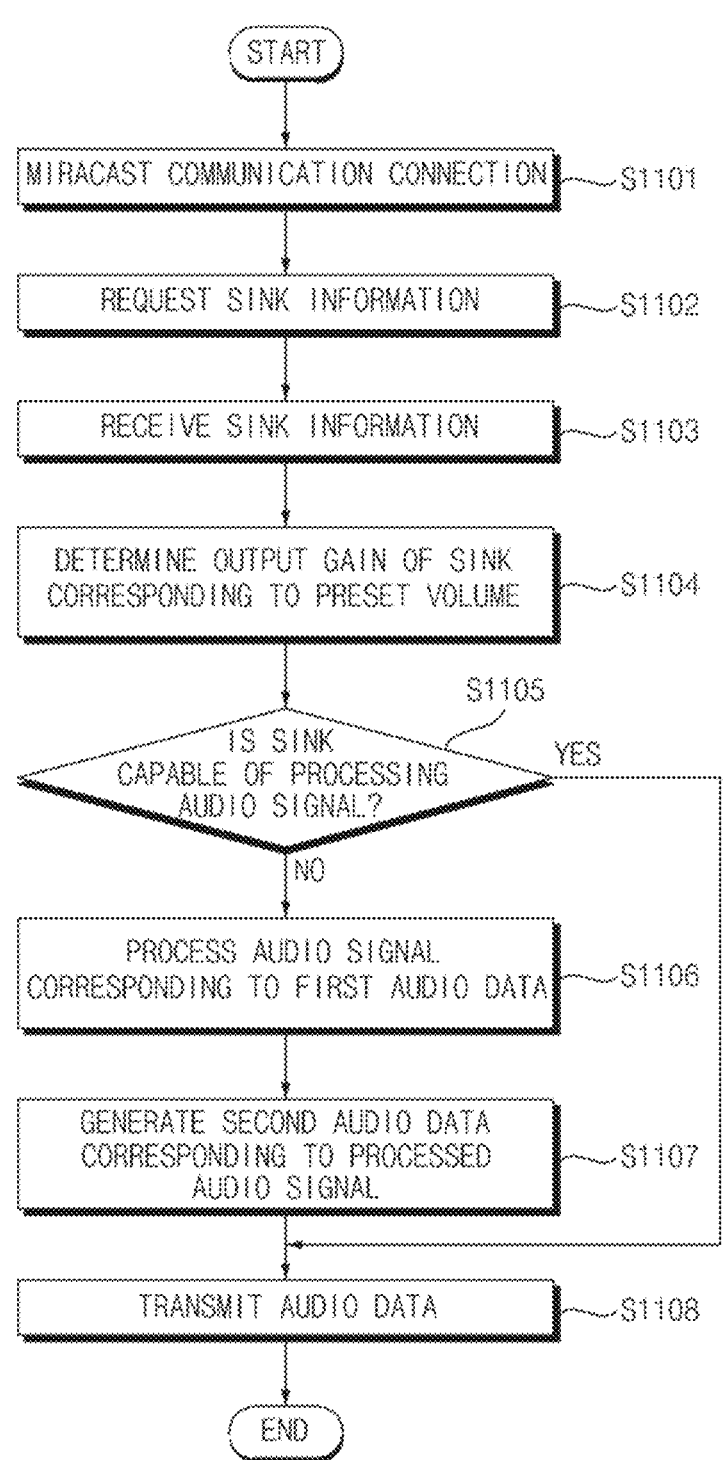

START

MIRACAST COMMUNICATION CONNECTION — S1101

REQUEST SINK INFORMATION — S1102

RECEIVE SINK INFORMATION — S1103

DETERMINE OUTPUT GAIN OF SINK CORRESPONDING TO PRESET VOLUME — S1104

IS SINK CAPABLE OF PROCESSING AUDIO SIGNAL? — S1105
YES
NO

PROCESS AUDIO SIGNAL CORRESPONDING TO FIRST AUDIO DATA — S1106

GENERATE SECOND AUDIO DATA CORRESPONDING TO PROCESSED AUDIO SIGNAL — S1107

TRANSMIT AUDIO DATA — S1108

END

IMAGE DISPLAY APPARATUS

CROSS REFERENCE TO RELATED APPLICATIONS

This non-provisional application claims the benefit under 35 U.S.C. § 119(a) to Patent Application No. 10-2023-0140067, filed in the Republic of Korea on Oct. 19, 2023, all of which is hereby expressly incorporated by reference into the present application.

BACKGROUND

1. Field

The present disclosure relates to an image display apparatus.

2. Description of the Related Art

An image display apparatus (or device) has a function of displaying an image to a user. Examples of the image display apparatus may include a television (TV), a monitor, a notebook computer, and the like having a Liquid Crystal Display (LCD) using liquid crystals or an Organic Light-Emitting Diode (OLED) display using OLEDs.

Such an image display apparatus may transceive data with various electronic devices in a wired/wireless manner. Recently, there has been increased use of screen sharing technology that allows a user to share a screen of an image display apparatus currently being used by the user with another display apparatus. Such a screen sharing function (or service) between a plurality of image display apparatuses is used or provided under various names, including Miracast, screen mirroring, airplay, wireless display (WiDi), etc.

Meanwhile, when a screen-sharing function, such as Miracast, is used between image display apparatuses or devices, it is common for a transmitting side device (i.e., the sender) to obtain information on a specification associated with image output of a receiving side device (i.e., the receiver), such as resolution, a supported codec, and the like, and to provide an optimized image signal to the receiving side device. However, unlike an image signal, an audio signal is transmitted by the transmitting side device regardless of the specification of the receiving side device. In this case, due to a difference between the specifications of the receiving side device and the transmitting side device, a difference occurs between the quality of audio output from the receiving side device and the quality of audio output from the transmitting side device.

SUMMARY

It is an objective of the present disclosure to solve the above and other problems.

It is another objective of the present disclosure to provide, when sharing a screen with an external device, an image display apparatus that can provide an optimized audio signal to the external device based on audio output information of the external device.

It is yet another objective of the present disclosure to provide, when sharing a screen with an external device, an image display apparatus that can be operated such that high-quality audio is output from the external device compared to a specification of the external device.

It is yet another objective of the present disclosure to provide, when sharing a screen with an external device, an image display apparatus that can ensure the continuity of settings associated with audio output.

According to an aspect of the subject matter described in this application, an image display apparatus includes: a display; a network interface configured to communicate with an external device; and a controller, the controller being configured to: obtain device information from the external device; based on the obtained device information, determine whether a specification of the external device in association with audio signal processing satisfies a predetermined criterion; based on a determination that the specification of the external device does not satisfy the predetermined criterion, transmit first audio data for predetermined content being displayed through the display; based on a determination that the specification of the external device does not satisfy the predetermined criterion, process an audio signal corresponding to the first audio data according to the specification of the external device; and generate second audio data corresponding to the processed audio signal to transmit the second audio data to the external device.

An image display apparatus according to the present disclosure has the following effects.

According to at least one of the embodiments of the present disclosure, when sharing a screen with an external device, it is possible to provide an optimized audio signal to the external device based on audio output information of the external device.

According to at least one of the embodiments of the present disclosure, when sharing a screen with an external device, it is possible to allow the external device to output high-quality audio compared to a specification of the external device.

According to at least one of the embodiments of the present disclosure, when sharing a screen with an external device, it is possible to ensure the continuity of settings associated with audio output.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF THE DRAWINGS

FIG. 11 is a flowchart illustrating a method of operating a source device, in accordance with another embodiment of the present disclosure.

DETAILED DESCRIPTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

Figure 1:
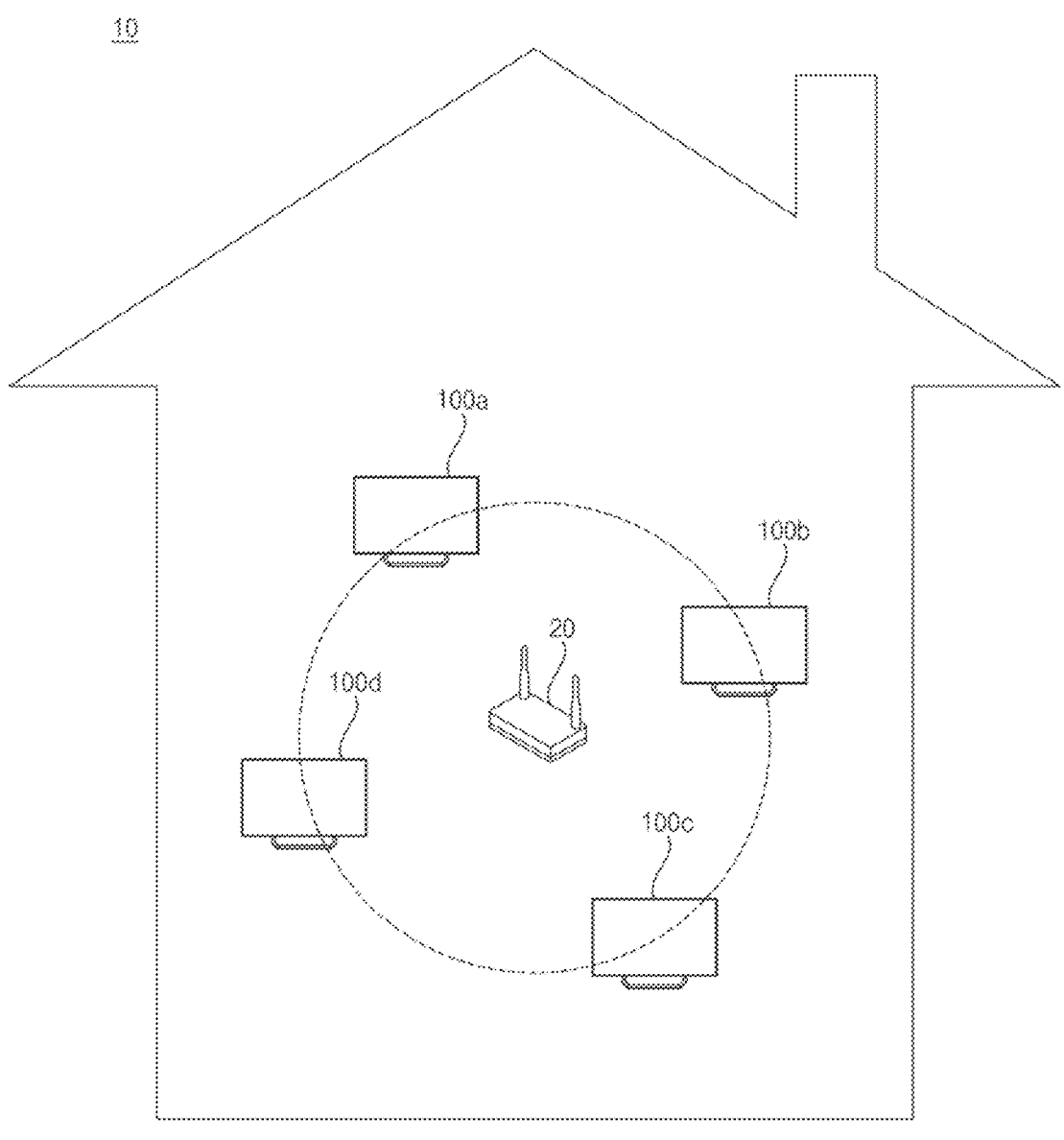
FIG. 1 is a diagram illustrating an image display system, in accordance with an embodiment of the present disclosure.

FIG. 1 is a diagram illustrating an image display system, in accordance with an embodiment of the present disclosure.

Referring to FIG. 1, an image display system 10 may include a plurality of image display apparatuses 100a to 100d. The image display system 10 may include a relay device, i.e., an access point (AP) 20.

An image display apparatus 100 may be an apparatus that processes and outputs an image. The image display apparatus 100 is not particularly limited, such as a TV, a notebook computer, a monitor, etc., as long as it can output a screen corresponding to an image signal.

The image display apparatus 100 may receive a broadcast signal and signal-process the broadcast signal to output a signal-processed broadcast image. When the image display apparatus 100 receives a broadcast signal, the image display apparatus 100 may correspond to a broadcast receiver.

The image display apparatus 100 may receive a broadcast signal wirelessly through an antenna, or may receive a broadcast signal in a wired manner through a cable. For example, the image display apparatus 100 may receive a terrestrial broadcast signal, a satellite broadcast signal, a cable broadcast signal, an Internet Protocol Television (IPTV) broadcast signal, etc.

The AP 20 may communicate with the image display apparatus 100. The AP 20 may be a networking sub-device that allows devices, connected to a local network provided by the AP 20, to transmit and receive data to and from each other, or to connect to a network such as the Internet.

The plurality of image display apparatuses 100a to 100d may mutually transmit and receive data via a local network provided by the AP 20. The image display apparatuses may transmit and receive data to and from each other using short-range wireless communication such as Wireless Fidelity (Wi-Fi), Bluetooth, Bluetooth Low Energy (BLE), Zigbee, Near Field Communication (NFC), etc.

Figure 2:
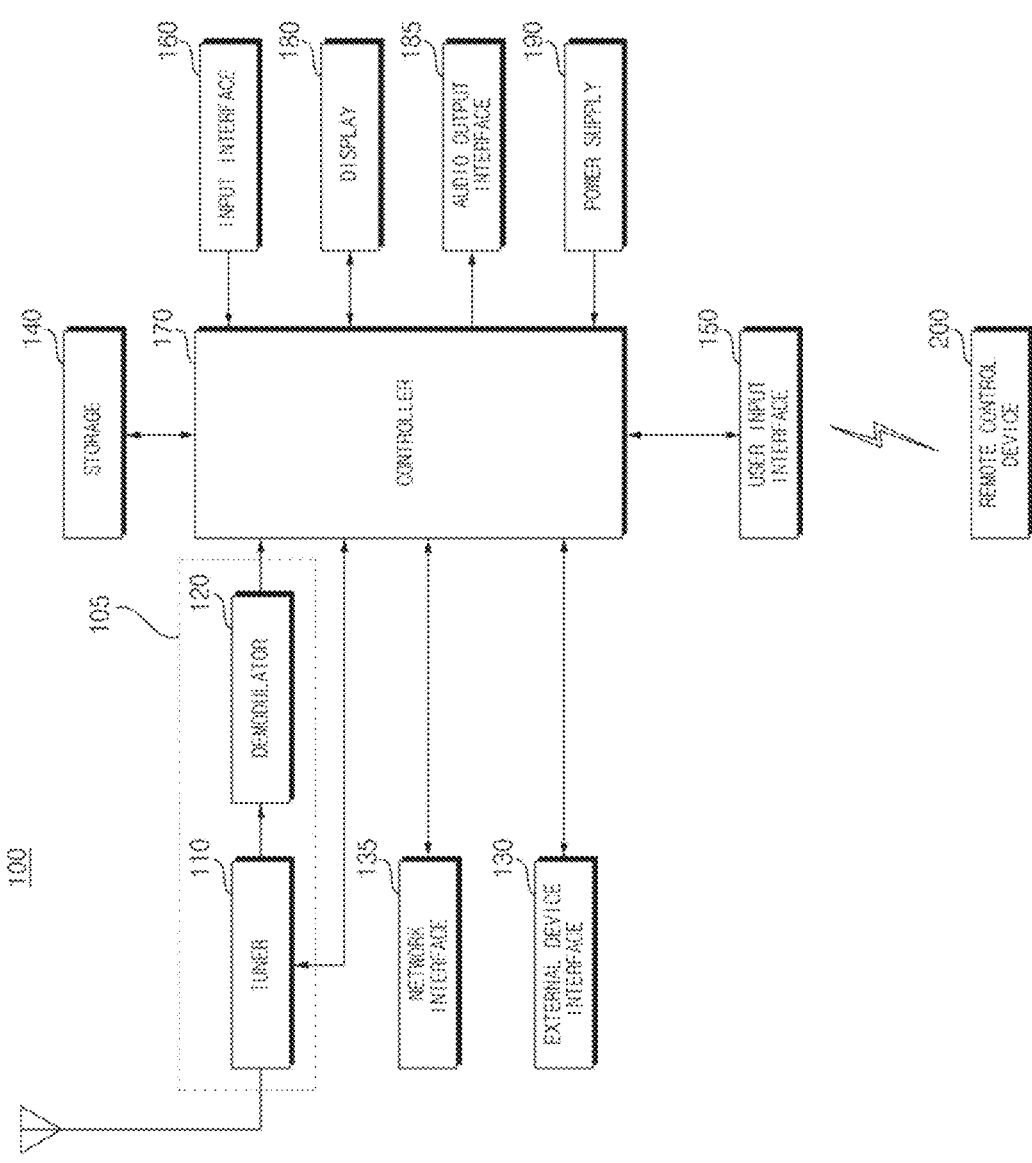
FIG. 2 is an internal block diagram of an image display apparatus, in accordance with an embodiment of the present disclosure.

FIG. 2 is an internal block diagram of an image display apparatus of FIG. 1.

Referring to FIG. 2, the image display apparatus 100 may include a broadcast receiver 105, an external device interface 130, a network interface 135, a storage 140, a user input interface 150, an input interface 160, a controller 170, a display 180, an audio output interface 185, and/or a power supply 190.

The broadcast receiver 105 may include a tuner 110 and a demodulator 120.

Meanwhile, unlike shown in the drawing, the image display apparatus 100 may include only the broadcast receiver 105 and the external device interface 130, among the broadcast receiver 105, the external device interface 130, and the network interface 135. That is, the image display apparatus 100 may not include the network interface 135.

The tuner 110 may select a broadcast signal corresponding to a channel selected by a user or each of all pre-stored channels from among broadcast signals received through an antenna (not shown) or a cable (not shown). The tuner 110 may convert the selected broadcast signal into an intermediate frequency signal or a baseband video or audio signal.

For example, when the selected broadcast signal is a digital broadcast signal, the tuner 110 may convert it into a digital IF (DIF) signal, whereas when the selected broadcast signal is an analog broadcast signal, the tuner 110 may convert it into an analog baseband video or audio signal (CVBS/SIF). That is, the tuner 110 may process the digital broadcast signal or the analog broadcast signal. The analog baseband video or audio signal (CVBS/SIF) output from the tuner 110 may be directly input to the controller 170.

Meanwhile, the tuner 110 may sequentially select broadcast signals corresponding to all broadcast channels stored through a channel memory function from among the received broadcast signals, and then may convert them into intermediate frequency signals or baseband video or audio signals.

Meanwhile, the tuner 110 may include a plurality of tuners to receive broadcast signals of a plurality of channels. Alternatively, the tuner 110 may be configured as a single tuner capable of simultaneously receiving broadcast signals of a plurality of channels.

The demodulator 120 may receive and demodulate the digital IF (DIF) signal converted by the tuner 110.

The demodulator 120 may perform demodulation and channel decoding to output a stream signal TS. Here, the stream signal TS may be a signal in which a video signal, an audio signal, and a data signal are multiplexed.

The stream signal output from the demodulator 120 may be input to the controller 170. The controller 170 may perform demultiplexing and video/audio signal processing, and then may output an image and sound through the display 180 and the audio output interface 185, respectively.

The external device interface 130 may transmit and receive data to and from an external device connected thereto. To this end, the external device interface 130 may include an A/V input and output interface (not shown).

The external device interface 130 may be connected to an external device such as a Digital Versatile Disc (DVD), a Blu-ray disc, a game console, a camera, a camcorder, a computer (e.g., a laptop computer), or a set-top box in a wired or wireless manner, and may perform input/output operations with the external device.

In addition, the external device interface 130 may establish a communication network with various remote control devices 200 as shown in FIG. 1, so as to receive a control signal related to the operation of the image display apparatus 100 from the remote control device 200 or transmit data related to the operation of the image display apparatus 100 to the remote control device 200.

The A/V input and output interface may receive video and audio signals from an external device. For example, the A/V input and output interface may include an Ethernet terminal, a USB terminal, a Composite Video Banking Sync (CVBS) terminal, a component terminal, an S-video terminal (analog), a Digital Visual Interface (DVI) terminal, a High-Definition Multimedia Interface (HDMI) terminal, a Mobile High-definition Link (MHL) terminal, a RGB terminal, a D-SUB terminal, an IEEE 1394 terminal, an SPDIF terminal, a liquid HD terminal, etc. Digital signals input through these terminals may be transmitted to the controller 170. In this case, analog signals input through the CVBS terminal and the S-video terminal may be converted by an analog-digital converter (not shown) to be transmitted to the controller 170.

The external device interface 130 may include a wireless communication interface (not shown) for short-range wireless communication with another electronic device. The wireless communication interface may allow the external device interface 130 to exchange data with a nearby mobile terminal nearby. For example, the external device interface 130 may receive device information, information about an application being executed, and an application image from the mobile terminal in a mirroring mode.

The external device interface 130 may use Bluetooth, Radio Frequency Identification (RFID), infrared Data Association (IrDA), Ultra-Wideband (UWB), ZigBee, or the like to perform short-range wireless communication.

The network interface 135 may provide an interface for connecting the image display apparatus 100 to a wired/wireless network including an internet network.

The network interface 135 may include a communication module (not shown) for connection to a wired/wireless network. For example, the network interface 135 may include a communication module for Wireless LAN (WLAN) (Wi-Fi), Wireless Broadband (WiBro), Worldwide Interoperability for Microwave Access (WiMAX), High Speed Downlink Packet Access (HSDPA), etc.

The network interface 135 may transmit or receive data with another user or another electronic device through a connected network or another network linked to the connected network.

The network interface 135 may receive web content or data provided by a content provider or a network operator. That is, the network interface 135 may receive, through a network, content such as movies, advertisements, games, VOD files, and broadcast signals provided by a content provider or a network operator, and information related thereto.

The network interface 135 may receive update information and update files of a firmware provided by a network operator, and may transmit data over Internet or to a content provider or a network provider.

The network interface 135 may select and receive, through a network, a desired application from among applications open to the public.

The storage 140 may store a program for processing and controlling each signal in the controller 170, or may store a signal-processed video, audio, or data signal. For example, the storage 140 may store applications designed to perform various tasks that can be processed by the controller 170, and may selectively provide some of the stored applications in response to a request from the controller 170.

The program stored in the storage 140 is not limited to any specific program, so long as it is capable of being executed by the controller 170.

The storage 140 may temporally store a video, audio or data signal received from an external device through the external device interface 130.

The storage 140 may store information about predetermined broadcast channels through a channel memory function such as channel map.

Although FIG. 2 illustrates that the storage 140 is provided separately from the controller 170, the present disclosure is not limited thereto. The storage 140 may be included in the controller 170.

The storage 140 may include at least one of volatile memory (e.g., DRAM, SRAM, SDRAM, etc.) or non-volatile memory (e.g., flash memory, hard disk drive (HDD), solid-state drive (SSD), etc.). In various embodiments of the present disclosure, the storage 140 and the memory may be used interchangeably.

The user input interface 150 may deliver a signal input by a user to the controller 170 or may deliver a signal from the controller 170 to the user.

For example, the user input interface 150 may transmit/receive a user input signal, such as power on/off, channel selection, or screen setting, to/from the remote control device 200, may transmit a user input signal input through a local key (not shown), such as a power key, a channel key, a volume key, or a setting key, to the controller 170, may transmit a user input signal input from a sensor (not shown) configured to sense a user's gesture, or may transmit a signal from the controller 170 to the sensor.

The input interface 160 may be provided on one side of a body of the image display apparatus 100. For example, the input interface 160 may include a touch pad, a physical button, etc.

The input interface 160 may receive various user commands related to the operation of the image display apparatus 100, and may transmit a control signal corresponding to the received command to the controller 170.

The input interface 160 may include at least one microphone (not shown), and may receive a user's voice through the microphone.

The controller 170 may include at least one processor, and may control the overall operation of the image display apparatus 100 using the processor included therein. Here, the processor may be a general processor such as a central processing unit (CPU). Alternatively, the processor may be a dedicated device such as an application-specific integrated circuit (ASIC), or may be any of other hardware-based processors.

The controller 170 may demultiplex a stream input through the tuner 110, the demodulator 120, the external device interface 130, or the network interface 135, or may process demultiplexed signals to generate and output a signal for video or audio output.

The display 180 may convert an image signal, a data signal, an on-screen display (OSD) signal or a control signal processed by the controller 170, or an image signal, a data signal or a control signal received from the external device interface 130 to generate a driving signal.

The display 100 may include a display panel (not shown) including a plurality of pixels.

The plurality of pixels provided in the display panel may include RGB subpixels. Alternatively, the plurality of pixels provided in the display panel may include RGBW subpixels. The display 180 may convert an image signal, a data signal, an OSD signal or a control signal processed by the controller 170 to generate a signal for driving the plurality of pixels.

The display 180 may be implemented as a plasma display panel (PDP) display, a liquid crystal display (LCD) display, an organic light-emitting diode (OLED) display or a flexible display, or may be implemented as a three-dimensional (3D) display. The 3D display 180 may be classified as a non-glasses type and a glasses type.

Further, the display 180 may be configured as a touch screen, and thus may be used not only as an output device but also as an input device.

The audio output interface 185 may receive an audio signal processed by the controller 170 to output sound.

The image signal processed by the controller 170 may be input to the display 180, allowing an image corresponding to the received image signal to be displayed. In addition, the image signal processed by the controller 170 may be input to an external output device through the external device interface 130.

The audio signal processed by the controller 170 may be output in the form of sound through the audio output interface 185. In addition, the audio signal processed by the controller 170 may be input to the external output device through the external device interface 130.

Although not illustrated in FIG. 2, the controller 170 may include a demultiplexer, an image processing unit, and the like. This will be described later with reference to FIG. 3.

The controller 170 may control the overall operation of the image display apparatus 100. For example, the controller 170 may control the tuner 110 to tune a broadcast signal corresponding to a channel selected by a user or a pre-stored channel.

In addition, the controller 170 may control the image display apparatus 100 in response to a command input by the user through the user input interface 150 or according to an internal program.

The controller 170 may control the display 180 to display an image. Here, the image displayed on the display 180 may be a still image or a moving image, and may be a 2D image or a 3D image.

The controller 170 may control such that a predetermined 2D object is displayed in the image displayed on the display 180. For example, the object may be at least one of a connected web screen (e.g., newspaper, magazine, etc.), an electronic program guide (EPG), various menus, a widget, an icon, a still image, a moving image, and a text.

Meanwhile, the image display apparatus 100 may further include a photographing unit (not shown). The photographing unit may photograph a user. The photographing unit may be configured as one camera, but is not limited thereto. The photographing unit may be configured as a plurality of cameras. The photographing unit may be embedded in the image display apparatus 100 at an upper portion of the display 180 or may be separately disposed. Information of an image captured by the photographing unit may be input to the controller 170.

The controller 170 may identify the location of a user based on an image captured by the photographing unit. For example, the controller 170 may identify a distance (z-axis coordinate) between the user and the image display apparatus 100. In addition, the controller 170 may determine the x-axis coordinate and the y-axis coordinate in the display 180 that correspond to the location of the user.

The controller 170 may detect a user's gesture based on an image captured by the photographing unit, each of signals sensed by the sensor, or a combination thereof.

The power supply 190 may supply corresponding power throughout the image display apparatus 100. In particular, the power supply 190 may supply power to the controller 170, which can be implemented in the form of a system-on-chip (SOC), the display 180 for displaying an image, and the audio output interface 185 for audio output.

Specifically, the power supply 190 may include a converter (not shown) for converting alternating-current (AC) power to direct-current (DC) power, and a DC/DC converter (not shown) for converting the level of DC power.

The remote control device 200 may transmit a user input to the user input interface 150. To this end, the remote control device 200 may use Bluetooth, Radio Frequency (RF) communication, Infrared Radiation (IR) communication, Ultra-Wideband (UWB), ZigBee, or the like. In addition, the remote control device 200 may receive a video, audio or data signal output from the user input interface 150, and may output the received signal in the form of an image or sound.

The image display apparatus 100 described above may be a digital broadcast receiver capable of receiving a fixed or mobile digital broadcast.

Meanwhile, the block diagram of the image display apparatus 100 shown in FIG. 2 is merely one example of the present disclosure. Respective components of the block diagram may be combined, added, or omitted depending on the specification of an image display apparatus 100 that is actually implemented.

In other words, two or more components may be combined into a single component, or one component may be subdivided into two or more components as necessary. In addition, the function performed in each block is illustrative only, and a specific operation or configuration thereof does not limit the scope of the present disclosure.

Figure 3:
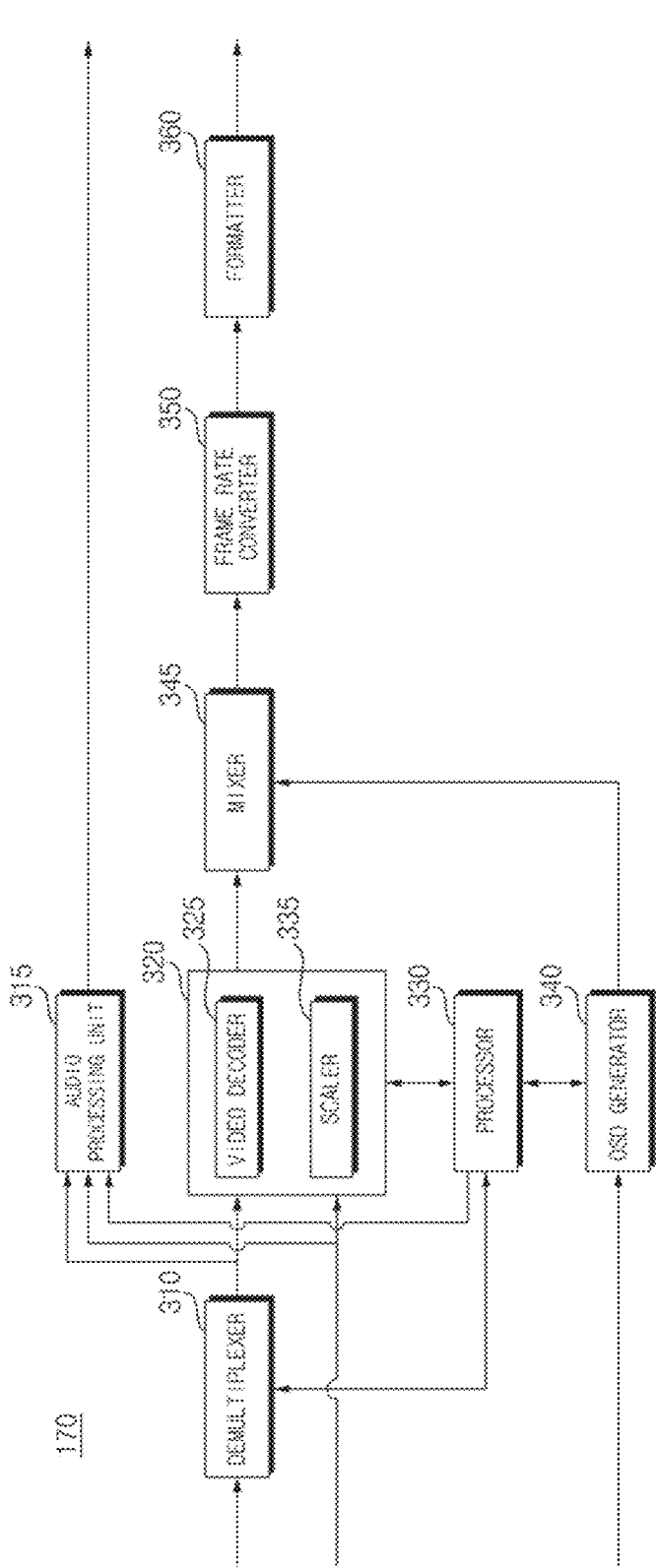
FIG. 3 is an internal block diagram of a controller, in accordance with an embodiment of the present disclosure.

FIG. 3 is an internal block diagram of a controller of FIG. 2.

Referring to FIG. 3, the controller 170 according to an embodiment of the present disclosure may include a demultiplexer 310, an audio processing unit 315, an image processing unit 320, a processor 330, an OSD generator 340, a mixer 345, a frame rate converter 350, and/or a formatter 360. The controller 170 may further include a data processing unit (not shown).

The demultiplexer 310 may demultiplex an input stream. For example, the demultiplexer 310 may demultiplex an MPEG-2 TS into an image signal, an audio signal, and a data signal. Here, the stream signal input to the demultiplexer 310 may be a stream signal output from the tuner 110, the demodulator 120, or the external device interface 130.

The audio processing unit 315 may perform audio signal processing on an audio signal demultiplexed by the demultiplexer 310 or an audio signal directly input from the external device interface 130 or the network interface 135. To this end, the audio processing unit 315 may include various decoders.

The audio processing unit 315 may include a mixer to mix audio signals decoded by various decoders, e.g., audio signals of various channels. The audio signal mixed by the mixer may be transmitted to the audio output interface 185.

The audio processing unit 315 may process the adjustment of bass, treble, volume, or may automatically process a sound filed signal.

The audio processing unit 315 may adjust at least one of a gain or a phase for each frequency band of an audio signal.

The processed audio signal may be output through the audio output interface 185 in the form of sound. The audio output interface 185 may consist of a digital amplifier (D-Amp) and/or a speaker. This will be described later with reference to FIG. 4.

The image processing unit 320 may perform image processing on the demultiplexed image signal. To this end, the image processing unit 320 may include a video decoder 325 and a scaler 335.

The video decoder 325 may decode the demultiplexed image signal, and the scaler 335 may perform scaling to allow the resolution of the decoded image signal to be displayed on the display 180.

The video decoder 325 may include decoders of different standards. For example, the video decoder 325 may include an MPEG-2 decoder, an H.264 decoder, a 3D video decoder for a color image and a depth image, a decoder for multi-view images, and the like.

The processor 330 may control the overall operation of the image display apparatus 100 or the controller 170. For example, the processor 330 may control the tuner 110 to tune a broadcast corresponding to a channel selected by a user or a pre-stored channel.

In addition, the processor 330 may control the image display apparatus 100 according to a user command input through the user input inface 150 or according to an internal program.

In addition, the processor 330 may control data transmission with the network interface 135 or the external device interface 130.

Further, the processor 330 may control the operation of the demultiplexer 310, the image processing unit 320, and the OSD generator 340 in the controller 170.

The OSD generator 340 may generate an OSD signal autonomously or according to a user input. For example, the OSD generator 340 may generate a signal for displaying various kinds of information in the form of a graphic image or a text on the screen of the display 180, based on a user input signal input through the input interface 160.

The generated OSD signal may include various data such as a user interface screen of the image display apparatus 100, various menu screens, widgets, icons, and the like. In addition, the generated OSD signal may include a 2D object or a 3D object.

In addition, the OSD generator 340 may generate a pointer that can be displayed on the display 180 based on a pointing signal received from the remote control device 200.

The OSD generator 340 may include a pointing signal processing unit (not shown) to generate a pointer. The pointing signal processing unit (not shown) may be provided separately instead of being provided in the OSD generator 340.

The mixer 345 may mix an OSD signal generated by the OSD generator 340 and a decoded image signal processed by the image processing unit 320. The mixed image signal may be provided to the frame rate converter 350.

The frame rate converter (FRC) 350 may convert the frame rate of an input image. Alternatively, the FRC 350 may output an input image without any frame rate conversion.

The formatter 360 may arrange a left-eye image frame and a right-eye image frame of the frame rate converted 3D image. The formatter 360 may output a synchronization signal Vsync to open the left eye glass or right eye glass of a 3D viewing device (not shown).

Meanwhile, the formatter 360 may change the format of an input image signal to an image signal suitable for being displayed on the display 180.

In addition, the formatter 360 may change the format of a 3D image signal. For example, the formatter 360 may change the format of a 3D image signal to one of various 3D formats such as a side-by-side format, a top/down format, a frame sequential format, an interlaced format, a checker box format.

Meanwhile, the formatter 360 may convert a 2D image signal into a 3D image signal. For example, according to a 3D image generation algorithm, the formatter 360 may detect an edge or a selectable object in a 2D image signal, and separate an object defined by the detected edge or the selectable object into a 3D image signal. Here, the generated 3D image signal may be separated into a left-eye image signal L and a right-eye image signal R to be aligned.

Although not shown in the drawing, a 3D processor (not shown) for processing a 3-dimensional (3D) effect signal may be further provided after the formatter 360. Such a 3D processor may perform brightness, tint, and color adjustment to improve 3D effects. For example, the 3D processor may perform signal processing to make the near clear and the far blurry. Meanwhile, the function of the 3D processor may be integrated into the formatter 360 or the image processing unit 320.

The data processing unit (not shown) in the controller 170 may perform data processing of a demultiplexed data signal. For example, when the demultiplexed data signal is an encoded data signal, the data processing unit may decode it. The encoded data signal may be electronic program guide (EPG) information including broadcasting information such as the start time and end time of broadcast programs aired on each channel.

Meanwhile, the block diagram of the controller 170 shown in FIG. 3 is merely one example of the present disclosure. Respective components of the block diagram may be combined, added, or omitted depending on the specification of a controller 170 that is actually implemented.

In particular, the audio processing unit 315, the frame rate converter 350, and the formatter 360 may, instead of being provided in the controller 170, be respectively provided separately from the controller 170 or may be provided as a single module separately from the controller 170.

Figure 4:
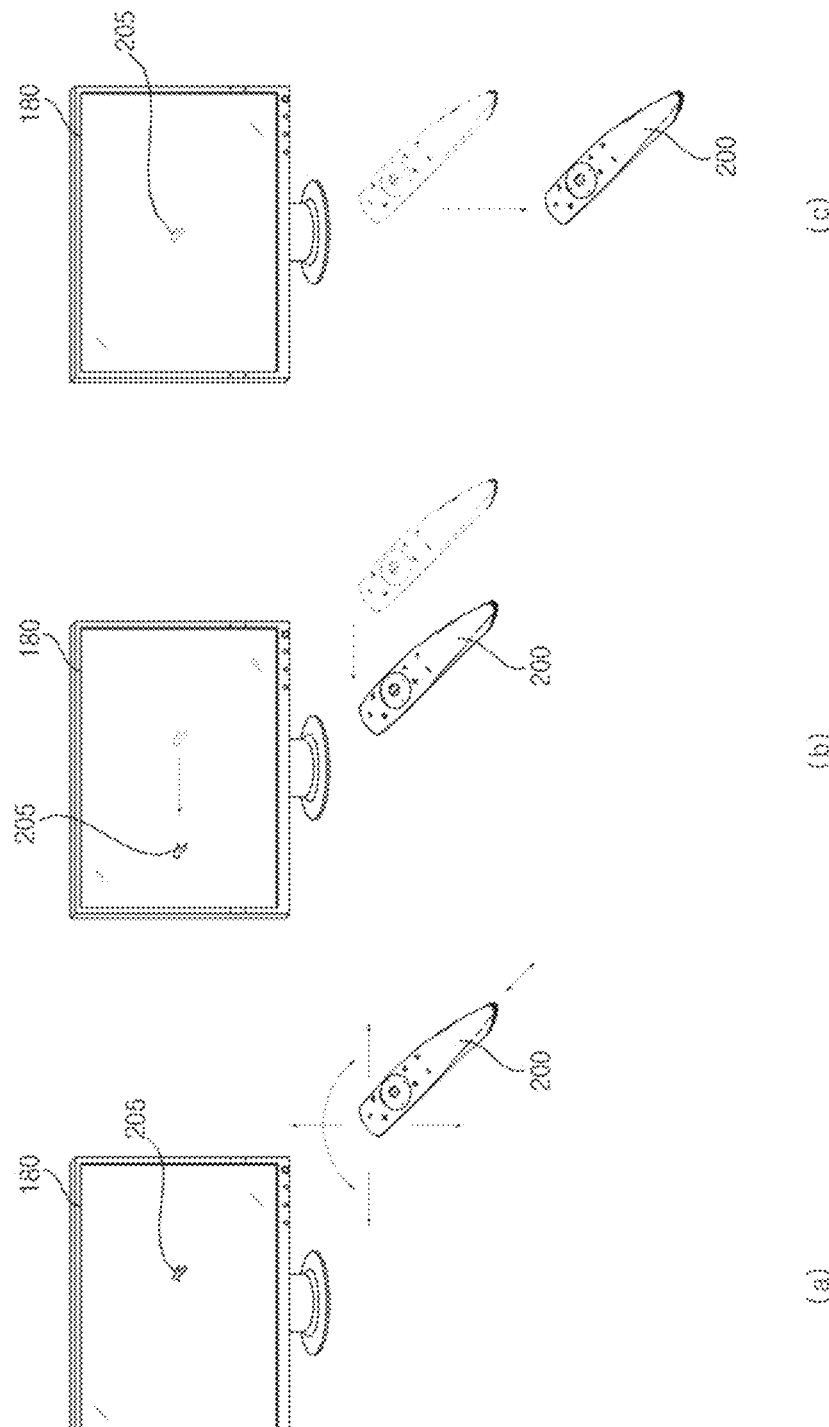
FIG. 4 is a diagram illustrating a control method of a remote control device, in accordance with an embodiment of the present disclosure.

FIG. 4 illustrates a control method of a remote control device of FIG. 2.

As shown in FIG. 4, a pointer 205 corresponding to the remote control device 200 may be displayed on the display 180 of the image display apparatus 100.

Referring to (a) of FIG. 4, a user may move the remote control device 200 up and down, left and right, and back and forth, or rotate it. The pointer 205 displayed on the display 180 of the image display apparatus 100 may correspond to movement of the remote control device 200. Such a remote control device 200 may be referred to as a spatial remote controller or a 3D pointing device, since the remote control device 200 allows a corresponding pointer 205 to be moved and displayed according to movement in a 3D space as shown in the drawing.

Referring to (b) of FIG. 4, when a user moves the remote control device 200 to the left, the pointer 205 displayed on the display 180 of the image display apparatus 100 may be moved to the left in response to the movement of the remote control device 200.

Information regarding the movement of the remote control device 200, which is sensed through a sensor of the remote control device 200, may be transmitted to the image display apparatus 100. The image display apparatus 100 may calculate the coordinates of the pointer 205 based on the information regarding the movement of the remote control device 200. The image display apparatus 100 may display the pointer 205 to correspond to the calculated coordinates.

Referring to (c) of FIG. 4, a user may move the remote control device 200 away from the display 180 while pressing a specific button on the remote control device 200. Then, a selection area in the display 180 corresponding to the pointer 205 may be zoomed in and displayed in an enlarged size. By contrast, when a user moves the remote control device 200 toward the display 180 while pressing a specific button on the remote control device 200, a selection area in the display 180 corresponding to the pointer 205 may be zoomed out and displayed in a reduced size.

Meanwhile, when the remote control device 200 is moved away from the display 180, a selection area may be zoomed out, and when the remote control device 200 is moved closer to the display 180, a selection area may be zoomed in.

Meanwhile, up and down and left and right movement of the remote control device 200 may not be recognized while a specific button in the remote control device 200 is pressed. That is, when the remote control device 200 is moved away from or closer to the display 180, up, down, left and right movement of the remote control device 200 may not be recognized, and only forward and backward movement of the remote control device 200 may be recognized. While the specific button in the remote control device 200 is not pressed, only up, down, left and right movement of the remote control device 200 may be recognized, and only the pointer 205 may be moved accordingly.

Meanwhile, the moving speed or moving direction of the pointer 205 may correspond to the moving speed or moving direction of the remote control device 200.

Figure 5:
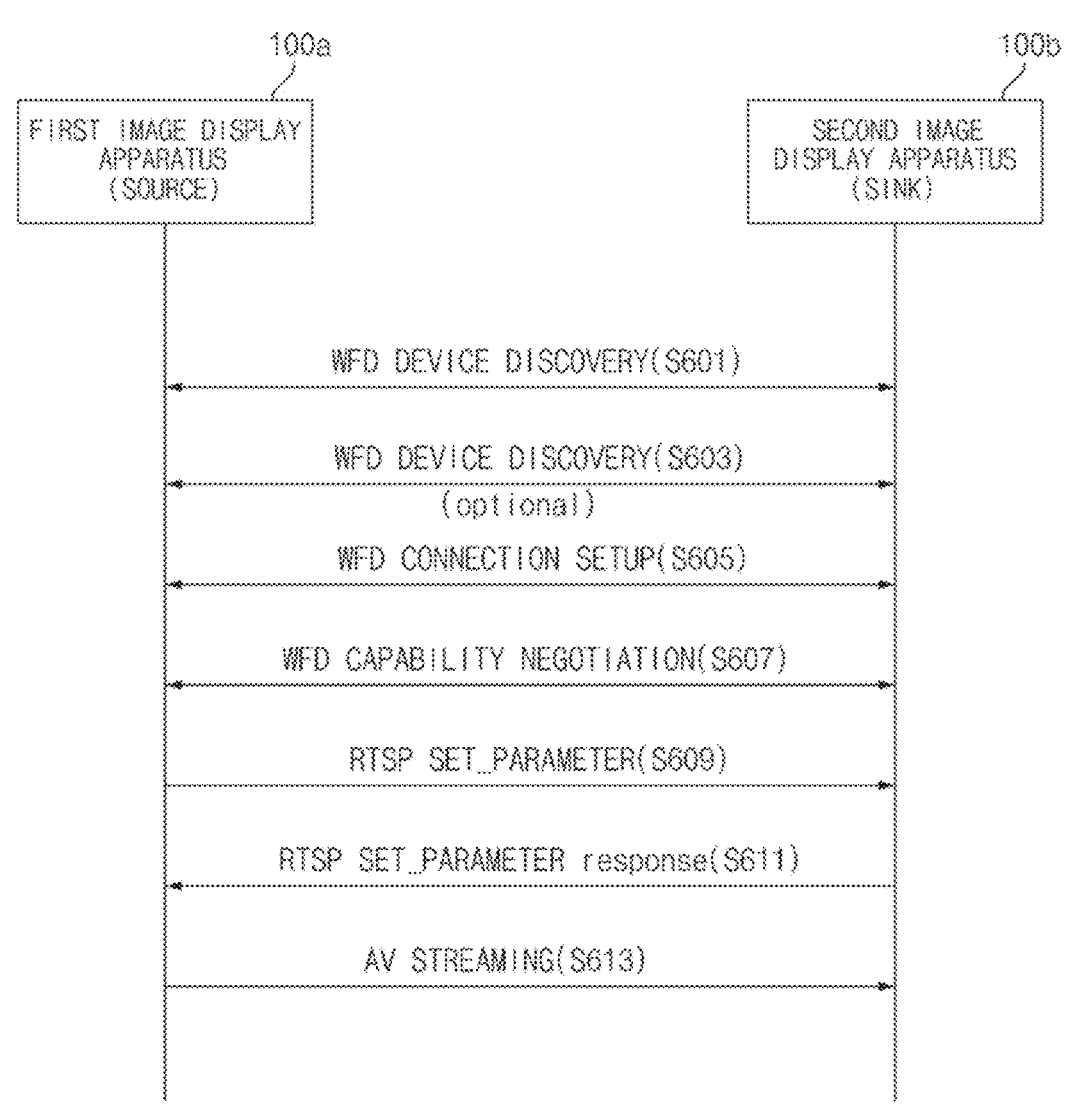
FIG. 5 is a flowchart for explaining a function of sharing a screen between image display apparatuses, in accordance with an embodiment of the present disclosure.

FIG. 5 is a flowchart for explaining a function of sharing a screen between image display apparatuses, in accordance with an embodiment of the present disclosure.

Referring to FIG. 5, a first image display apparatus 100a may be referred to as a Wi-Fi display (WFD) source, a source device, or the like, which provides content. A second image display apparatus 100b may be referred to as a WFD sink, a sink device, or the like, which receives and renders content.

In operation S601, the first image display apparatus 100a and the second image display apparatus 100b may discover each other's presence through WFD device discovery. The first image display apparatus 100a and the second image display apparatus 100b may recognize each other's presence through a probe request frame and a probe response frame, which contain a WFD information element (WFD IE). Here, the WFD IE may include basic information, such as a device type and a device state (or status), to establish an optimal connection between devices. For example, when the second image display apparatus 100b receives a probe request frame including a WFD IE, the second image display apparatus 100b may transmit a probe response frame including its WFD IE in response to receiving the probe request frame. Meanwhile, when the first image display apparatus 100a and the second image display apparatus 100b are connected to the AP 20 and operate as Wi-Fi P2P devices, two or more Wi-Fi transceivers may logically operate in one physical device.

In operation S603, the first image display apparatus 100a and the second image display apparatus 100b may discover the service capability of each other. For example, when the first image display apparatus 100a transmits a service discovery request frame that includes WFD capability as an information sub-element, the second image display apparatus 100b may transmit, in response thereto, a service discovery response frame that includes its WFD capability as an information sub-element.

Meanwhile, the first image display apparatus 100a or the second image display apparatus 100b may select a peer WFD device for WFD connection setup. A peer WFD device for processing WFD connection setup may be selected by a user input, or a peer WFD device for processing WFD connection setup may be automatically selected according to a policy.

In operation S605, the first image display apparatus 100a and the second image display apparatus 100b may select a WFD connection setup method with the selected peer WFD device. The first image display apparatus 100a and the second image display apparatus 100b may establish a WFD connection using a connectivity scheme of one of Wi-Fi P2P and Tunneled Direct Link Setup (TDLS). The first image display apparatus 100a and the second image display apparatus 100b may determine a connectivity scheme based on preferred connectivity information and an associated BSSID sub-element delivered along with a WFD IE.

In operation S607, the first image display apparatus 100a and the second image display apparatus 100b may perform WFD capability negotiation. The first image display apparatus 100a and the second image display apparatus 100b may exchange a message using a Real-Time Streaming Protocol (RTSP) to determine a parameter set defining an audio/video payload during a WFD session. The first image display apparatus 100a and the second image display apparatus 100b may exchange their apparatus information. For example, by using the RTSP protocol, the first image display apparatus 100a may request the second image display apparatus 100b to transmit apparatus information. In response to this, the second image display apparatus 100b may transmit its apparatus information to the first image display apparatus 100a. Here, the apparatus information of the second image display apparatus 100b may include image information such as a resolution and a video codec supported by the second image display apparatus 100b. The apparatus information of the second image display apparatus 100b may include audio information such as a sound field effect, an audio channel and an audio codec supported by the second image display apparatus 100b.

In operation S609, during a WFD capability negotiation process, the first image display apparatus 100a may transmit a necessary request message to the second display apparatus 100b by using the RTSP protocol. For example, based on the image information received from the second image display apparatus 100b, the first image display apparatus 100a may transmit, to the second image display apparatus 100b by using the RTSP protocol, a message indicating that an image of content corresponding to a specific resolution is to be delivered. For example, based on the audio information received from the second image display apparatus 100b, the first image display apparatus 100a may transmit, to the second image display apparatus 100b by using the RTSP protocol, a message indicating that audio of content with a specific sound field effect is to be delivered.

In operation S611, based on the request message received from the first image display apparatus 100a, the second image display apparatus 100b may transmit a response message through the RTSP protocol. Meanwhile, the operation S609 and the operation S611 may be included in the operation S607 for WFD capability negotiation.

When the WFD capability negotiation is finished success-fully, a WFD session (or a Miracast session) may be estab-lished between the first image display apparatus 100a and the second image display apparatus 100b. In operation S613, an image signal and/or an audio signal may be streamed to the second image display apparatus 100b from the first image display apparatus 100a.

Figure 6:
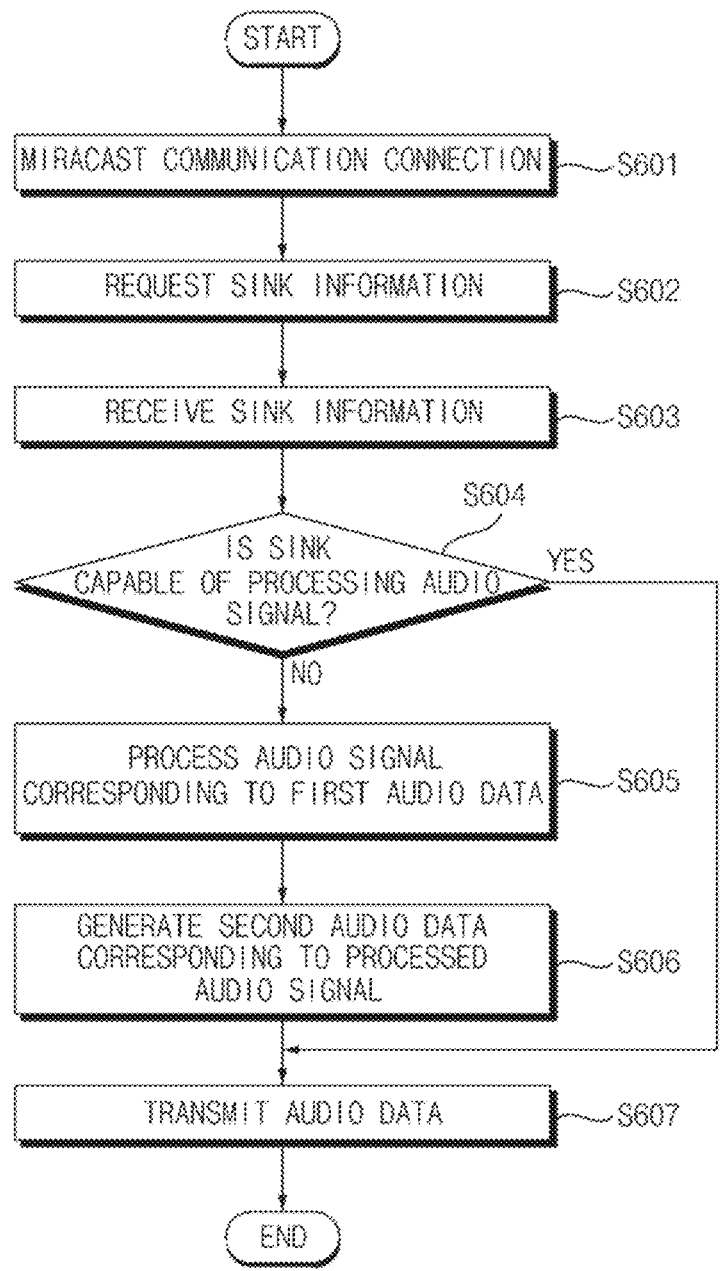
FIG. 6 is a flowchart illustrating a method of operating a source device, in accordance with an embodiment of the present disclosure.

FIG. 6 is a flowchart illustrating a method of operating a source device, in accordance with an embodiment of the present disclosure. The same description as provided with reference to FIG. 5 will be omitted.

Referring to FIG. 6, in operation S601, the source device 100a may perform communication connection with the sink device 100b. For example, the source device 100a and the sink device 100b may perform a negotiation procedure for Miracast connection.

In operation S602, the source device 100a may request the sink device 100b to transmit device information. For example, the source device 100a may request the sink device 100b to transmit image information and/or audio informa-tion.

In operation S603, the source device 100a may receive the device information from the sink device 100b. For example, the source device 100a may receive, from the sink device 100b, device information that includes resolution informa-tion, video codec information, audio codec information and sound field effect information supported by the sink device 100b, audio channel information of the sink device 100b, operation mode information, manufacturer information, model name information, user input back channel (UIBC) information, etc.

In operation S604, based on the device information of the sink device 100b, the source device 100a may determine whether a specification in association with audio signal processing satisfies a predetermined criterion. For example, the source device 100a may determine whether it is possible for the sink device 100b to process an audio signal to correspond to the source device 100a. When it is possible for the sink device 100b to process an audio signal in corre-spondence to the source device 100a, the predetermined criterion may be satisfied.

In one implementation, the source device 100a may process an audio signal so that a sound field effect is applied according to a sound equalizer setting corresponding to a genre of content. For example, the source device 100a may determine a genre of the content provided to the sink device 100 by checking metadata of the content, analyzing an image frame based on an algorithm using machine learning, or the like. In this case, the source device 100a may determine a genre of the content to determine whether the sink device 100b is capable of processing an audio signal so that a sound filed effect is applied according to a sound equalizer setting corresponding to the genre of the content.

In one implementation, the source device 100a may process an audio signal so that a predetermined sound effect for stereophonic sound (e.g., Dolby Atmos) is applied using a predetermined audio codec. In this case, the source device 100a may determine whether the sink device 100b is capable of processing the audio signal so that the predetermined sound effect for stereophonic sound is applied through the predetermined audio codec.

In operation S605, when the specification in association with audio signal processing does not satisfy the predeter-mined criterion, the source device 100a may process an audio signal corresponding to first audio data for content to correspond to the sink device 100b. For example, when it is not possible for the sink device 100b to process an audio signal according to a genre of content, the source device 100a may determine a genre of the content and process the audio signal according to a sound equalizer setting corre-sponding to the determined genre. For example, when it is not possible for the sink device 100b to process an audio signal by applying a predetermined sound effect for stereo-phonic sound (e.g., Dolby Atmos), the source device 100a may process the audio signal by applying a predetermined sound effect.

In one implementation, the source device 100a may process an audio signal based on audio channel information of the sink device 100b. For example, when an audio signal corresponding to first audio data is an audio signal of channel 5.1, and the sink device 100b includes a speaker of channel 2, the source device 100a may down-mix the audio signal of channel 5.1 to correspond to channel 2. In addition, the source device 100a may process the audio signal by applying a sound field effect to correspond to channel 2.

In operation S606, the source device 100a may generate second audio data corresponding to the processed audio signal.

In operation S607, the source device 100a may transmit audio data to the sink device 100b. For example, when the specification in association with audio signal processing satisfies the predetermined criterion, the source device 100a may transmit the first audio data to the sink device 100b. For example, when the specification in association with audio signal processing does not satisfy the predetermined crite-rion, the source device 100a may transmit the second audio data to the sink device 100b.

Figure 7:
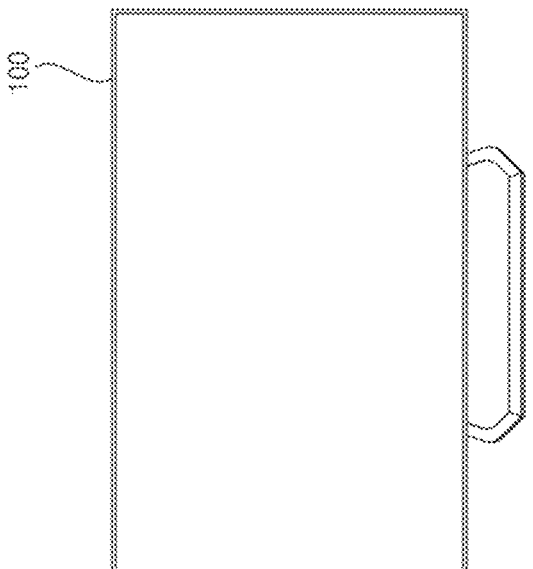
FIGS. 7 and 8 are diagrams for explaining a function of sharing a screen between image display apparatuses, in accordance with an embodiment of the present disclosure.
Figure 7:
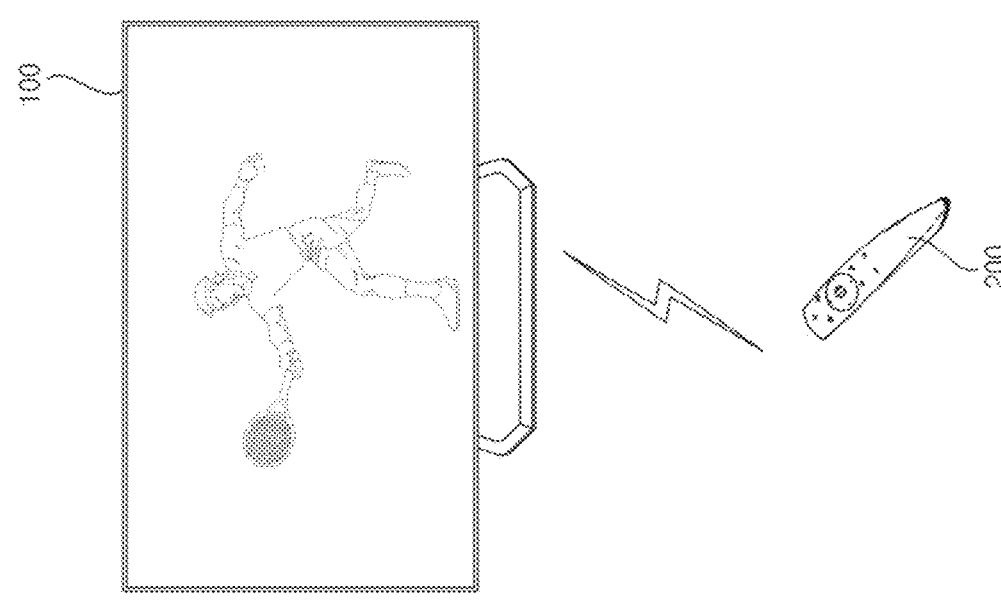

Referring to FIG. 7, the source device 100a and the sink device 100b may perform Miracast connection while the source device 100a outputs a screen on which predetermined content is displayed. In this case, the source device 100a may receive device information of the sink device 100b in a negotiation procedure for the Miracast connection.

Figure 8:
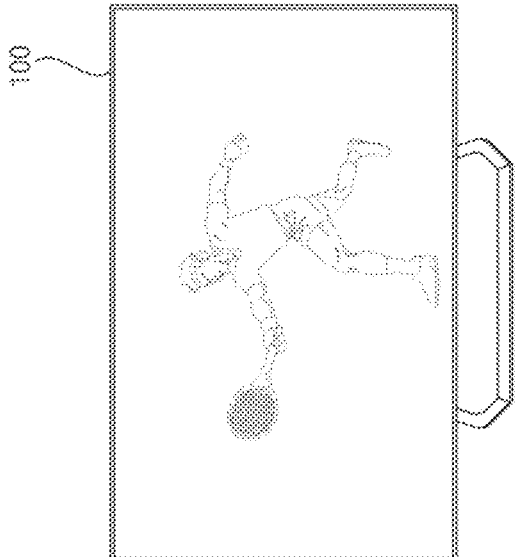
Figure 8:
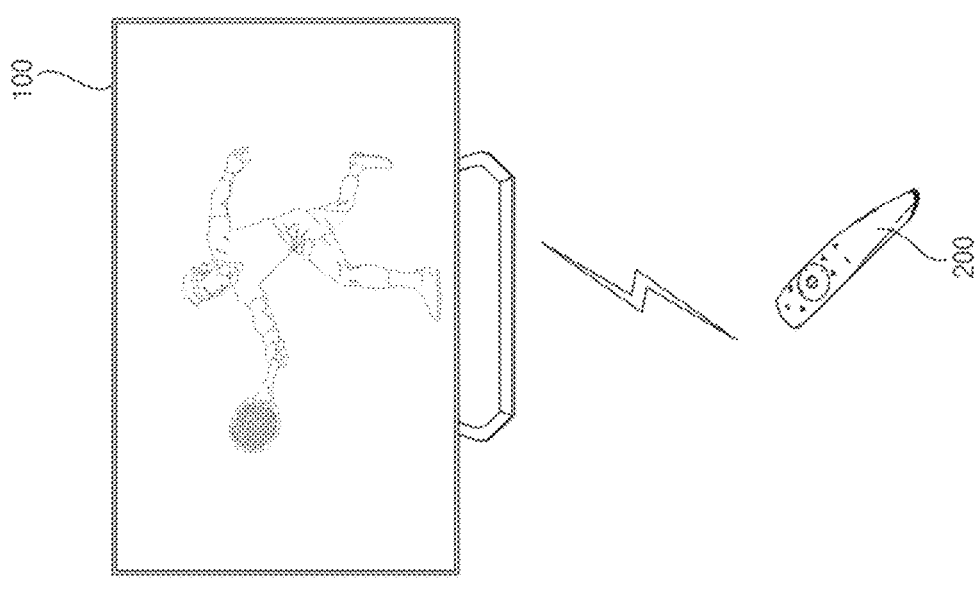

Referring to FIG. 8, based on image information included in the device information of the sink device 100b, the source device 100a may transmit image data for the predetermined content. For example, the source device 100a may transmit image data for the predetermined content corresponding to a resolution of the sink device 100b to the sink device 100b. In this case, based on the image data received from the source device 100a, the sink device 100b may output a screen on which the predetermined content is displayed.

Meanwhile, based on audio information included in the device information of the sink device 100b, the source device 100a may transmit audio data for the predetermined content to the sink device 100b. Based on the audio data received from the source device 100a, the sink device 100b may output audio for the predetermined content.

Figure 9:
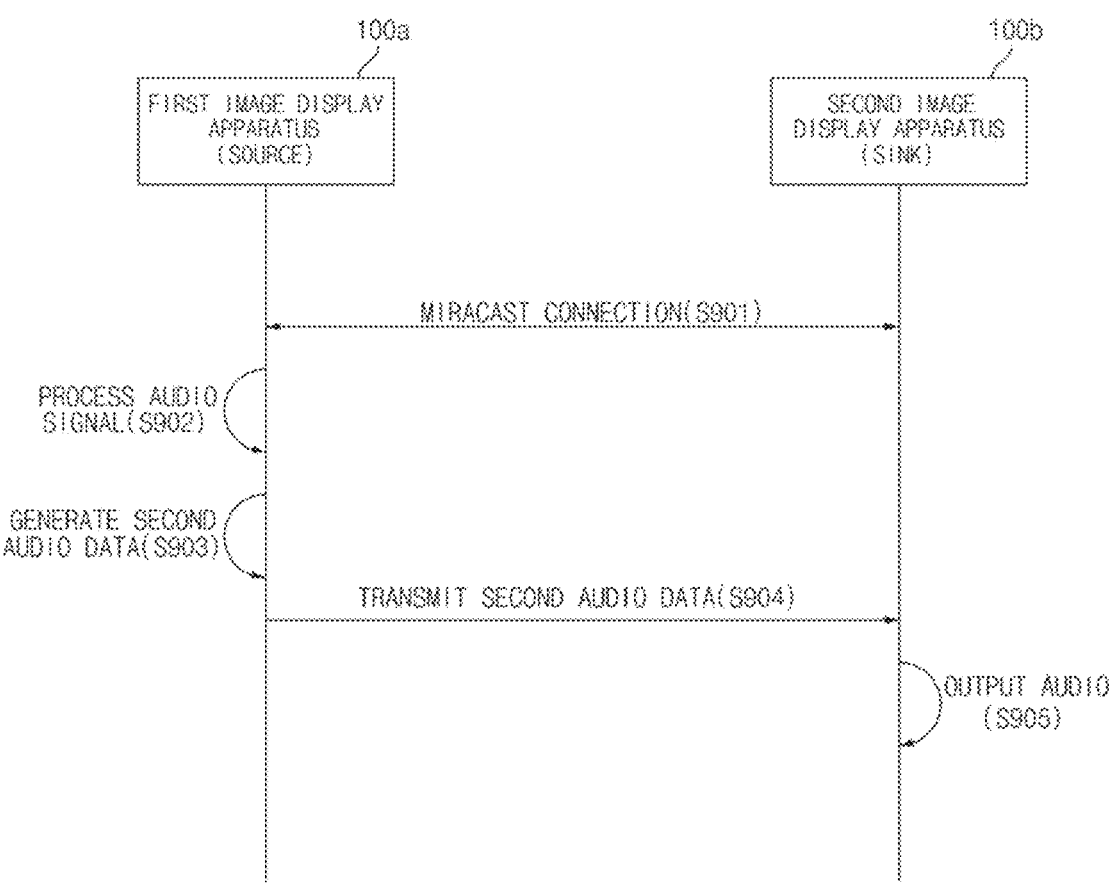
FIGS. 9 and 10 are flowcharts for explaining operations of image display apparatuses according to the specification of a sink device, in accordance with an embodiment of the present disclosure.
Figure 10:
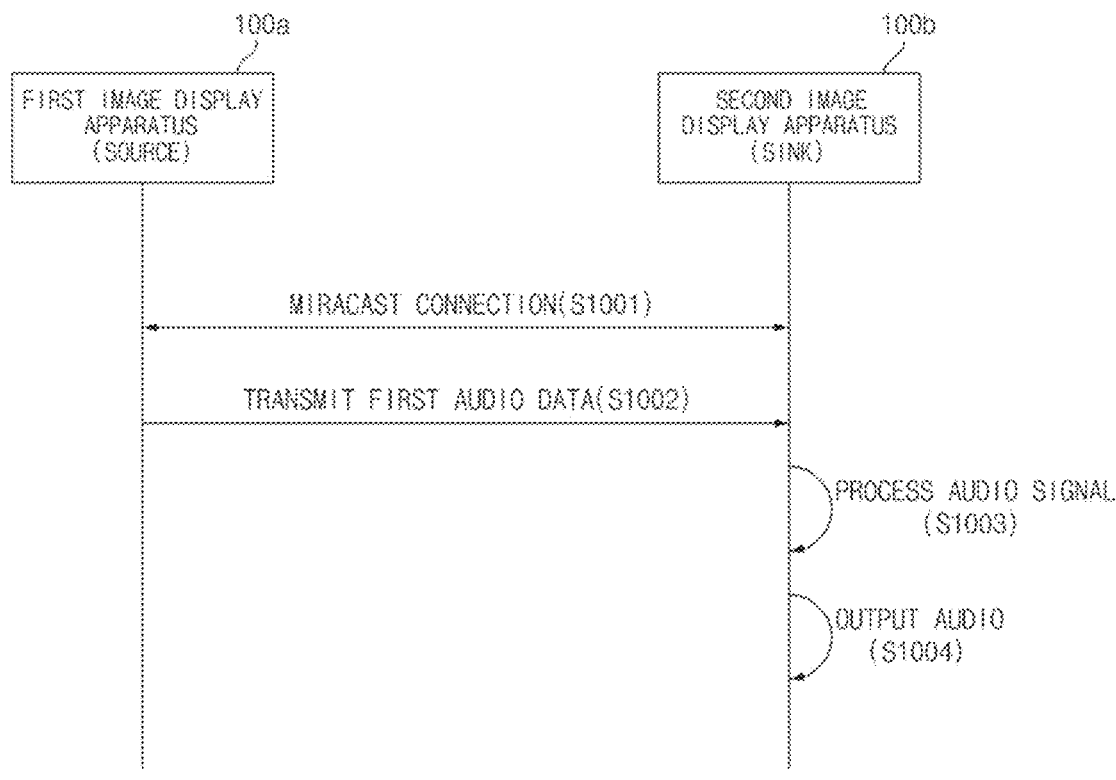

FIGS. 9 and 10 are flowcharts for explaining operations of image display apparatuses according to a specification of a sink device, in accordance with an embodiment of the present disclosure.

Referring to FIG. 9, in operation S901, the source device 100a and the sink device 100b may perform Miracast connection. In this case, the source device 100a may receive device information of the sink device 100b in a negotiation procedure for the Miracast connection.

In operation S902, when it is not possible for the sink device 100b to process an audio signal to correspond to the source device 100a, the source device 100a may process an audio signal corresponding to first audio data for predeter-mined content in correspondence to the sink device 100b. For example, the source device 100 may determine a genre of the content and process the audio signal so that a sound field effect is applied according to a sound equalizer setting corresponding to the determined genre. For example, the source device 100*a* may process the audio signal so that a predetermined sound effect for stereophonic sound (e.g., Dolby Atmos) is applied using a predetermined audio codec.

In operation S903, the source device 100*a* may generate second audio data corresponding to the processed audio signal.

In operation S904, the source device 100*a* may transmit the generated second audio data to the sink device 100*b*.

In operation S905, the sink device 100*b* may output audio of the predetermined content based on the second audio data received from the source device 100*a*. In this case, the sink device 100*b* may process the second audio data and output the audio signal as is, which is processed, by the source device 100*a*, in such a manner that a sound field effect is applied.

Thus, although processing of the first audio data is not possible due to the specification of the sink device 100*b*, the source device 100*a* may provide an optimized audio signal to the sink device 100*b*, allowing the sink device 100*b* to output audio optimized for the predetermined content.

Meanwhile, referring to FIG. 10, in operation S1001, the source device 100*a* and the sink device 100*b* may perform Miracast connection. In this case, the source device 100*a* may receive device information of the sink device 100*b* in a negotiation procedure for the Miracast connection.

In operation S1002, when it is possible for the sink device 100*b* to process an audio signal to correspond to the source device 100*a*, the source device 100*a* may transmit first audio data for predetermined content to the sink device 100*b*.

In operation S1003, the sink device 100*b* may process an audio signal corresponding to the first audio data for the predetermined content. For example, the sink device 100*b* may determine a genre of the content and process the audio signal so that a sound field effect is applied according to a sound equalizer setting corresponding to the determined genre. For example, the sink device 100*b* may process the audio signal so that a predetermined sound effect for stereophonic sound (e.g., Dolby Atmos) is applied using a predetermined audio codec.

In operation S1004, the sink device 100*b* may output audio of the predetermined content according to the processed audio signal.

FIG. 11 is a flowchart illustrating a method of operating a source device, in accordance with another embodiment of the present disclosure. The same description as provided with reference to FIG. 5 and FIG. 6 will be omitted.

Referring to FIG. 11, in operation S1101, the source device 100*a* may perform communication connection with the sink device 100*b*. For example, the source device 100*a* and the sink device 100*b* may perform a negotiation procedure for Miracast connection.

In operation S1102, the source device 100*a* may request the sink device 100*b* to transmit device information.

In operation S1103, the source device 100*a* may receive the device information from the sink device 100*b*. For example, the source device 100*a* may receive, from the sink device 100*b*, power information for audio output of the sink device 100*b*.

In operation S1104, the source device 100*a* may determine an output gain of the sink device 100*b* corresponding to preset volume. For example, based on volume information of the source device 100*a*, power information for audio output of the source device 100*a* and/or power information for audio output of the sink device 100*b*, the source device 100*a* may determine an output gain of the sink device 100*b* corresponding to the preset volume. Meanwhile, the source device 100*a* may include a gain table for the level of volume information of the source device 100*a* and power information for audio output of the sink device 100*b*. In this case, the source device 100*a* may determine, based on the gain table, a gain corresponding to the volume information of the source device 100*a* and the power information for audio output of the sink device 100*b* as an output gain of the sink device 110*b*.

In operation S1105, based on the device information of the sink device 100*b*, the source device 100*a* may determine whether it is possible for the sink device 100*b* to process an audio signal to correspond to the source device 100*a*.

In operation S1106, when it is not possible for the sink device 100*b* to process the audio signal to correspond to the source device 100*a*, the source device 100*a* may process an audio signal corresponding to first audio data for content in correspondence to the sink device 100*b*.

In operation S1107, the source device 100*a* may generate second audio data corresponding to the processed audio signal.

In operation S1108, the source device 100*a* may transmit audio data to the sink device 100*b*. In this case, the source device 100*a* may transmit data for the output gain of the sink device 110*b* to the sink device 100*b*. For example, when it is possible for the sink device 100*b* to process the audio signal to correspond to the source device 100*a*, the source device 100*a* may transmit the first audio data to the sink device 100*b*. For example, when it is not possible for the sink device 100*b* to process the audio signal to correspond to the source device 100*a*, the source device 100*a* may transmit the second audio data to the sink device 100*b*.

Meanwhile, in one implementation, the source device 100*a* may transmit its volume information and power information for audio output to the sink device 100*b*. In this case, based on the volume information of the source device 100*a* and the power information for audio output of the source device 100*a*, the sink device 100*b* may determine an output gain of the sink device 100*b* corresponding to preset volume to output audio.

As described above, according to at least one of the embodiments of the present disclosure, when sharing a screen with an external apparatus or device 100*b*, it is possible to provide an optimized audio signal to the external device 100*b* based on audio output information of the external device 100*b*.

According to at least one of the embodiments of the present disclosure, when sharing a screen with an external apparatus or device 100*b*, it is possible to allow the external device 100*b* to output high-quality audio compared to a specification of the external device 100*b*.

According to at least one of the embodiments of the present disclosure, when sharing a screen with an external apparatus or device 100*b*, it is possible to ensure the continuity of settings associated with audio output.

Referring to FIGS. 1 to 16, according to an aspect of the present disclosure, an image display apparatus 100 includes: a display; a network interface configured to communicate with an external device; and a controller. The controller may be configured to: obtain device information from the external device; based on the obtained device information, determine whether a specification of the external device in association with audio signal processing satisfies a predetermined criterion; based on a determination that the specification of the external device does not satisfy the predetermined criterion, transmit first audio data for predetermined content being displayed through the display; based on a determination that the specification of the external device does not satisfy the predetermined criterion, process an audio signal corresponding to the first audio data according to the specification of the external device; and generate second audio data corresponding to the processed audio signal to transmit the second audio data to the external device.

In some implementations, the device information may include at least one of a sound field effect provided by the external device, an audio codec supported by the external device, and an audio channel of the external device.

In some implementations, when a predetermined function of sharing a screen being displayed through the display with the external device is used, the controller may be configured to obtain the device information from the external device.

In some implementations, the predetermined function may be a function of sharing the screen on the external device via Miracast connection.

In some implementations, the controller may be configured to obtain the device information from the external device in a negotiation procedure for the Miracast connection.

In some implementations, the controller may be configured to: when audio signal processing in association with a predetermined sound field effect is not enabled by the external device, determine that the specification of the external device does not satisfy the predetermined criterion; and in response to the predetermined sound field effect, process the audio signal according to a preset setting of a sound equalizer.

In some implementations, the controller may be configured to: when audio signal processing using a predetermined audio codec is not enabled by the external device, determine that the specification of the external device does not satisfy the predetermined criterion; and process the audio signal using the predetermined audio codec.

In some implementations, the controller may be configured to process the audio signal to correspond to an audio channel of the external device.

In some implementations, the device information may include power information for audio output of the external device. The controller may be configured to: determine, based on preset volume information and the power information of the external device, an output gain of the external device; and transmit data for the determined output gain to the external device.

In some implementations, the controller may be configured to transmit preset volume information and power information for audio output of the image display apparatus to the external device.

The above description should not be construed as restrictive in all aspects but considered as illustrative. The scope of the disclosure should be determined by reasonable interpretation of the appended claims and all changes that come within the equivalent scope of the disclosure are included in the scope of the disclosure.

Meanwhile, the method of operating the image display apparatus according to the present disclosure may be implemented as processor-readable codes in a processor-readable recording medium. The processor-readable recording medium may be any type of recording device capable of storing data readable by a processor. Examples of the processor-readable recording medium may include a ROM, a RAM, a CD-ROM, a magnetic tape, a floppy disc, and an optical data storage device. Also, the processor-readable recording medium may be implemented as a carrier wave (e.g., data transmission over the Internet). The processor-readable recording medium may be distributed to a computer system connected via a network so that the processor-readable codes may be saved and executed in a distributed manner.

Although the preferred embodiments of the present disclosure have been illustrated and described, those skilled in the art will appreciate that the present disclosure should not be limited to the above specific embodiments and various modifications thereof are possible without departing from the scope and spirit of the disclosure as disclosed in the accompanying claims and these modifications should not be understood independently of the technical idea of the present disclosure.

What is claimed is:

1. An image display apparatus comprising:
a display;
a network interface configured to communicate with an external device; and
a controller,
wherein the controller is configured to:
obtain device information from the external device;
determine, based on the obtained device information, whether an audio signal processing specification of the external device satisfies a predetermined criterion;
based on a determination that the specification of the external device satisfies the predetermined criterion, transmit first audio data for predetermined content being displayed through the display;
based on a determination that the specification of the external device does not satisfy the predetermined criterion,
process an audio signal corresponding to the first audio data according to the specification of the external device;
generate second audio data corresponding to the processed audio signal; and
transmit the second audio data to the external device,
wherein the device information includes power information for audio output of the external device, and
wherein the controller is configured to:
determine, based on preset volume information of the image display apparatus, and the power information of the external device, an output gain of the external device; and
transmit data for the determined output gain to the external device.

2. The image display apparatus of claim 1, wherein the device information includes at least one of an audio channel of the external device, a sound field effect provided by the external device, and an audio codec supported by the external device.

3. The image display apparatus of claim 1, wherein, when a predetermined function of sharing a screen being displayed through the display with the external device is used, the controller is configured to obtain the device information from the external device.

4. The image display apparatus of claim 3, wherein the predetermined function is a function of sharing the screen on the external device via Miracast connection.

5. The image display apparatus of claim 4, wherein the controller is configured to obtain the device information from the external device in a negotiation procedure for the Miracast connection.

6. The image display apparatus of claim 1, wherein the controller is configured to:
when audio signal processing in association with a predetermined sound field effect is not enabled by the external device, determine that the specification of the external device does not satisfy the predetermined criterion; and in response to the predetermined sound field effect, process the audio signal according to a preset setting of a sound equalizer.

7. The image display apparatus of claim 1, wherein the controller is configured to:

when audio signal processing using a predetermined audio codec is not enabled by the external device, determine that the specification of the external device does not satisfy the predetermined criterion; and process the audio signal using the predetermined audio codec.

8. The image display apparatus of claim 1, wherein the controller is configured to process the audio signal to correspond to an audio channel of the external device.

9. The image display apparatus of claim 1, wherein the controller is configured to transmit preset volume information and power information for audio output of the image display apparatus to the external device.

\* \* \* \* \*